(12) United States Patent
Hashiguchi et al.

(10) Patent No.: US 10,890,886 B2
(45) Date of Patent: *Jan. 12, 2021

(54) CONTROLLER FOR MANAGING SWITCHED HIERARCHICAL CONTROL STATES

(71) Applicant: Yokogawa Electric Corporation, Tokyo (JP)

(72) Inventors: Masahiro Hashiguchi, Tokyo (JP); Kenji Torigoe, Tokyo (JP); Nobuaki Ema, Tokyo (JP); Naruaki Shimizu, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,402

(22) Filed: Dec. 18, 2018

(65) Prior Publication Data

US 2019/0121309 A1   Apr. 25, 2019

Related U.S. Application Data

(63) Continuation of application No. 14/918,673, filed on Oct. 21, 2015, now Pat. No. 10,209,694.

(30) Foreign Application Priority Data

Nov. 13, 2014   (JP) .................................. 2014-230695

(51) Int. Cl.
   *G05B 19/04* (2006.01)
   *G05B 19/042* (2006.01)
(52) U.S. Cl.
   CPC .. *G05B 19/0423* (2013.01); *G05B 2219/1138* (2013.01); *G05B 2219/25369* (2013.01)

(58) Field of Classification Search
   None
   See application file for complete search history.

(56) References Cited

U.S. PATENT DOCUMENTS

| | | | |
|---|---|---|---|
| 6,704,737 B1 | 3/2004 | Nixon et al. | |
| 7,027,981 B2 * | 4/2006 | Bizjak | H03G 3/3089 381/106 |

(Continued)

FOREIGN PATENT DOCUMENTS

| | | |
|---|---|---|
| EP | 3012697 A1 | 4/2016 |
| JP | 2013-161199 A | 8/2013 |

OTHER PUBLICATIONS

Åström,K..J.; Anton,J.J.; and Årzén,K.-E., "Expert Control", 1986, Automatica, 22(3), 277-286, https://doi.org/10.1016/0005-1098(86)90026-9. (Year: 1986).*

(Continued)

*Primary Examiner* — Mohammad Ali
*Assistant Examiner* — Kelvin Booker
(74) *Attorney, Agent, or Firm* — Sughrue Mion, PLLC

(57) ABSTRACT

An input-output apparatus is provided. The apparatus includes a lower-level layer interface connected to a field device, a higher-layer interface connected to a controller, a maintenance interface connected to a setting apparatus, a switch, and a control device. The switch switches between a first connection and a second connection. The control device, in an engineering mode, permits the switch to transition freely between the first connection and the second connection, and in an operation mode, controls the switch to switch to the first connection and prohibits communication through the maintenance interface. In response to a permission command received through the higher-level layer interface, the control device permits communication through the maintenance interface, and in response to a connection request received through the maintenance interface when the (Continued)

control device permits communication with the maintenance interface, the control device controls the switch to switch from the first connection to the second connection.

2 Claims, 6 Drawing Sheets

(56) References Cited

U.S. PATENT DOCUMENTS

| | | | |
|---|---|---|---|
| 7,385,995 B2* | 6/2008 | Stiscia | H04J 3/1682 |
| | | | 370/412 |
| 8,027,473 B2* | 9/2011 | Stiscia | H04L 63/0428 |
| | | | 370/397 |
| 9,219,760 B2 | 12/2015 | Flanders et al. | |
| 10,083,143 B2* | 9/2018 | Tanimura | G06F 13/409 |
| 10,248,606 B2* | 4/2019 | Tanimura | G06F 13/409 |
| 2002/0111948 A1 | 8/2002 | Nixon et al. | |
| 2003/0004952 A1 | 1/2003 | Nixon et al. | |
| 2003/0153988 A1 | 8/2003 | Shepard et al. | |
| 2005/0085928 A1 | 4/2005 | Shani | |
| 2005/0096872 A1* | 5/2005 | Blevins | G05B 17/02 |
| | | | 702/183 |
| 2005/0164684 A1* | 7/2005 | Chen | G05B 19/0423 |
| | | | 455/414.1 |
| 2006/0010230 A1 | 1/2006 | Karklins et al. | |
| 2006/0277479 A1 | 12/2006 | Britt et al. | |
| 2006/0294312 A1* | 12/2006 | Walmsley | H04L 9/0662 |
| | | | 711/122 |
| 2007/0282458 A1 | 12/2007 | Yamada et al. | |
| 2008/0133030 A1 | 6/2008 | Torigoe | |
| 2009/0271726 A1 | 10/2009 | Gavimath et al. | |
| 2011/0015763 A1 | 1/2011 | Mustonen et al. | |
| 2011/0072506 A1* | 3/2011 | Law | H04L 63/0227 |
| | | | 726/11 |
| 2012/0232869 A1 | 9/2012 | Maturana et al. | |
| 2013/0006399 A1 | 1/2013 | Tandon et al. | |
| 2013/0125232 A1 | 5/2013 | Hogan | |
| 2013/0253671 A1 | 9/2013 | Torigoe | |
| 2014/0067089 A1 | 3/2014 | Kanbe et al. | |
| 2015/0105878 A1* | 4/2015 | Jones | G06F 9/44505 |
| | | | 700/83 |
| 2015/0120972 A1* | 4/2015 | Tanimura | G06F 13/409 |
| | | | 710/106 |
| 2015/0193418 A1* | 7/2015 | Koska | H04L 67/10 |
| | | | 715/223 |
| 2016/0012846 A1* | 1/2016 | Wilson | G11B 5/02 |
| | | | 360/46 |
| 2016/0065656 A1 | 3/2016 | Patin et al. | |
| 2016/0092386 A1* | 3/2016 | Sakamoto | G06F 13/387 |
| | | | 710/106 |
| 2016/0110304 A1* | 4/2016 | Mori | G05B 19/0423 |
| | | | 710/306 |
| 2017/0176982 A1 | 6/2017 | Lutz et al. | |
| 2017/0300024 A1 | 10/2017 | Nixon et al. | |
| 2017/0371311 A1* | 12/2017 | Aparicio Ojea | G05B 19/0423 |
| 2018/0011465 A1* | 1/2018 | Lo | G05B 19/042 |
| 2018/0341609 A1* | 11/2018 | Tanimura | G06F 13/409 |

OTHER PUBLICATIONS

Blanke,M.; Izadi-Zannanabadi,R.; Bogh,S.A.; and Lunau,C.P., "Fault-Tolerant Control Systems-A Holistic View", 1997, Control Eng. Practice, vol. 5, No. 5, pp. 693-702. (Year: 1997).*

Jammes,F. and Smit,H., "Service-Oriented Paradigms in Industrial Automation", Feb. 15-17, 2005, Proceedings of the 23rd IASTED Intl. Multi-Conference on Parallel and Distributed Computing and Networks. (Year: 2005).*

Willis,M. and Tham,M., "Advanced Process Control", Apr. 1994, Dept. of Chemical and Process Engineering University of Newcastle upon Tyne Newcastle upon Tyne. (Year: 1994).*

* cited by examiner

| MODE | TRANSITION STATE | SWITCH 25 | SWITCH 24 |
|---|---|---|---|
| ENGINEERING MODE | Online | ON | O |
| | Maintenance | ON | M |
| OPERATING MODE | Online/M-Port Disable | OFF | O |
| | Online/M-Port Enable | ON | O |
| | Maintenance | ON | M |

| MODE | TRANSITION STATE | SWITCH 25 | SWITCH 31 |
|---|---|---|---|
| OPERATING MODE | Online | OFF | O |
| | M-Port Enable | ON | O |
| | Maintenance | ON | M |
| | Online Wait | ON | N (NEUTRAL) |

CONTROLLER FOR MANAGING SWITCHED HIERARCHICAL CONTROL STATES

CROSS-REFERENCE TO RELATED APPLICATIONS

This application is a Continuation of U.S. application Ser. No. 14/918,673, filed Oct. 21, 2015, which claims priority from Japanese Patent Application No. 2014-230695, filed Nov. 13, 2014 in the Japanese Patent Office, the contents of each of which are incorporated by reference herein in their entireties.

BACKGROUND OF THE INVENTION

Field of the Invention

Embodiments of the present invention generally relate to the field of input-output apparatuses used in process control systems.

Related Art

The related-art process control systems are constructed which control various state amounts (for example, pressure, temperature, flow rate, etc.) in industrial processes in plants, factories, and the like, achieving sophisticated automatic operations. Such process control systems are configured such that on-site devices (a measurement instrument, an operation instrument) that are generally called field devices are connected to a controller through an I/O module. The controller controls the operation instrument (for example, an actuator) in response to measured results of the measurement instrument (for example, a sensor) to control the above-described various state amounts.

Here, the number of field devices provided in a plant, etc., generally increases or decreases in accordance with the size of the plant, etc. Large scale plants, etc., may employ up to thousands, even tens of thousands, of such devices. It is therefore important to be able to efficiently, and, in a short time, set not only the field devices, but also input-output apparatuses used in the process control systems to reduce time and costs required for launching and maintenance of the process control systems. To and from the above-described input-output apparatuses, signals from the field devices or signals to the field devices are input/output. Besides the above-described controllers and I/O modules, the field devices may include network repeaters, remote I/O devices, wireless gateways, and the like.

JP 2013-161199A discloses a system in which a maintenance port is provided in an input-output apparatus used in a process control system, and a setting device which is a device for conducting maintenance can be connected to the maintenance port for the system to be able to perform various types of maintenance even during system operation. JP 2013-161199A discloses the various types of maintenance conducted through the maintenance port, including acquisition of device states, changes to device parameters, firmware updates, etc.

Now, with the system disclosed in JP 2013-161199 A, a setting device may be connected to the maintenance port provided in the input-output apparatus to conduct maintenance even during the system operation to increase efficiency of the maintenance. However, when such a maintenance port is provided, a malicious third party may connect a setting apparatus to the input-output apparatus, and change the content of setting the device or cause malware to be introduced into the process control system, possibly leading to a reduced level of security.

Here, the following measures are possible which prevent the reduced level of security in the process control system in which the input-output apparatus having the maintenance port is used:

(1) housing the input-output apparatus in a cabinet to lock the housed input-output apparatus;

(2) setting a password for the maintenance port of the input-output apparatus; and (3) instituting a permission system for access to the maintenance port of the input-output apparatus by a higher-level apparatus.

The measures in (1) that physically house a plurality of input-output apparatuses in the cabinet may almost certainly prevent unauthorized access to the maintenance port of the plurality of input-output apparatuses. However, to house all of the input-output apparatuses provided in the plant, etc., in the cabinets may require several hundred or more of the cabinets, greatly increasing costs. Further, tasks like searching for an appropriate key for a specific cabinet to perform reliable locking may require quite cumbersome tasks.

The measures in (2) set passwords by software for the maintenance ports of the input-output apparatuses. However, the number of maintenance ports for which setting of the passwords is required is greater than or equal to the number of cabinets used in the measures in (1), causing measures in (2) to require even more cumbersome tasks than the measures in (1). Using a common password could alleviate the burden of the tasks, but security could be substantially reduced if the password is compromised.

The measures in (3) that are disclosed in JP 2013-161199 A are predicated on having a higher-level apparatus (operation monitoring apparatus) located at a level which is higher than that of the controller. Therefore, when the higher-level apparatus is not in operation or when communications with the higher-level apparatus cannot be conducted, the input-output apparatus maintenance ports cannot be accessed.

Here, at the time of launching or maintenance of the process control system, it is desirable to have an easy access to the maintenance port of the input-output apparatus to efficiently set the input-output apparatus used in the process control system. On the other hand, from the viewpoint of ensuring security during process control system operation, it is desirable to strictly limit access to the maintenance port of the input-output apparatus.

SUMMARY

In view of the above-described circumstances, an object of the present invention is to provide an input-output apparatus which can efficiently make various settings at the time of launching or maintenance of a process control system and which can ensure a high level of security at the time of operation of the process control system.

According to one embodiment of the present invention, an input-output apparatus which is used in a process control system is provided, including: a first interface to which a lower-level apparatus is connected; a second interface to which a higher-level apparatus is connected; a third interface to which an external setting apparatus is connected; a switcher which switches between a connection of the second interface to the first interface and a connection of the third interface to the first interface; and a control device which, when in a first state in which the second interface is connected to the first interface by the switcher and the connection of the third interface to the first interface is permitted, controls the switcher to cause transitioning to a second state in which the third interface and the first interface are connected when a connection request to the first interface is input through the third interface.

In the input-output apparatus according to one embodiment of the present invention, when, after causing transitioning to the second state, communications with the setting apparatus connected to the third interface are blocked, or when there is a transition instruction from the setting apparatus, the control device controls the switcher to cause transitioning to the first state.

In the input-output apparatus according to one embodiment of the present invention, when a connection request to the first interface is input through the second interface when in the first state, the control device controls the switcher to cause transitioning to a third state in which, by the switcher, the second interface is connected to the first interface and the connection of the third interface to the first interface is disabled.

In the input-output apparatus according to one embodiment of the present invention, the control device causes transitioning to the first state when a command indicating that the connection of the third interface to the first interface be permitted is input through the second interface when in the third state.

The input-output apparatus according to one embodiment of the present invention further includes a switch which causes a space between the third interface and the control device to be in an open state or a closed state, wherein the control device controls the switch to be in the open state when causing transitioning to the third state and controls the switch to be in the closed state when causing transitioning to the first state.

In the input-output apparatus according to one embodiment of the present invention, the switcher can switch to a fourth state in which neither the second interface nor the third interface is connected to the first interface, and, the control device controls the switcher to cause transitioning to the fourth state when, after causing transitioning to the second state, communications with the setting apparatus connected to the third interface are blocked, or when there is a transition instruction from the setting apparatus.

In the input-output apparatus according to one embodiment of the present invention, the control device controls the switcher to cause transitioning to the second state when a connection request to the first interface is input through the third interface when in the fourth state.

In the input-output apparatus according to one embodiment of the present invention, the control device controls the switcher to cause transitioning to the third state in which the second interface and the first interface are connected and a connection between the third interface and the first interface is disabled when a connection request to the first interface is input through the second interface when in the fourth state.

In the input-output apparatus according to one embodiment of the present invention, the control device causes transitioning to the first state when a command indicating that the connection of the third interface to the first interface be permitted is input through the second interface when in the third state.

The input-output apparatus according to one embodiment of the present invention further includes a switch which causes a space between the third interface and the control device to be in an open state or a closed state, wherein the control device causes the switch to be in the open state when causing transitioning to the third state and causes the switch to be in the closed state when causing transitioning to the first state.

The input-output apparatus according to one embodiment of the present invention further includes a timer which measures a predetermined time which is pre-defined, wherein the control device controls the switcher to cause transitioning to the fourth state when the first state continues for the predetermined time.

According to one embodiment of the present invention, an input-output apparatus is provided, including: a first interface; a second interface which can establish a connection to the first interface; a third interface which can establish a connection to the first interface; a switcher which switches between the connection of the second interface to the first interface and the connection of the third interface to the first interface; and a control device which, when in a first state in which the second interface is connected to the first interface by the switcher and the connection of the third interface to the first interface is permitted, controls the switcher to cause transitioning to a second state in which the third interface and the first interface are connected when a connection request to the first interface is input through the third interface, wherein, when a connection request to the first interface is input through the second interface when in the first state, the control device controls the switcher to cause transitioning to a third state in which, by the switcher, the second interface is connected to the first interface and the connection of the third interface to the first interface is disabled.

In the input-output apparatus according to one embodiment of the present invention, when, after causing transitioning to the second state, communications with an external setting apparatus connected to the third interface are blocked, or when there is a transition instruction from the setting apparatus, the control device controls the switcher to cause transitioning to the first state.

In the input-output apparatus according to one embodiment of the present invention, the control device causes transitioning to the first state when a command indicating that the connection of the third interface to the first interface be permitted is input through the second interface when in the third state.

The input-output apparatus according to one embodiment of the present invention further includes a switch which causes an open state in which the third interface and the control device are connected and a closed state in which the third interface and the control device are disconnected, wherein the control device controls the switch to be in the open state when causing transitioning to the third state and controls the switch to be in the closed state when causing transitioning to the first state.

In the input-output apparatus according to one embodiment of the present invention, the switcher can switch to a fourth state in which neither the second interface nor the third interface is connected to the first interface, and, the control device controls the switcher to cause transitioning to the fourth state when, after causing transitioning to the second state, communications with an external setting apparatus connected to the third interface are blocked, or when there is a transition instruction from the setting apparatus.

In the input-output apparatus according to one embodiment of the present invention, the control device controls the switcher to cause transitioning to the second state when a connection request to the first interface is input through the third interface when in the fourth state.

In the input-output apparatus according to one embodiment of the present invention, the control device controls the switcher to cause transitioning to the third state in which the second interface and the first interface are connected and the connection between the third interface and the first interface is disabled when a connection request to the first interface is input through the second interface when in the fourth state.

In the input-output apparatus according to one embodiment of the present invention, the control device causes transitioning to the first state when a command indicating that the connection of the third interface to the first interface be permitted is input through the second interface when in the third state.

According to one embodiment of the present invention, a process control system is provided, including: one or a plurality of field devices; a controller; the above-described input-output apparatus that connects the one or the plurality of field devices to the controller and that is used in the process control system; an external setting apparatus which can be connected to the input-output apparatus; an operation monitoring terminal; and an engineering terminal, wherein the controller, the operation monitoring terminal, and the engineering terminal are connected to a control network.

According to embodiments of the present invention, in a state in which a switcher causes the second interface and the first interface to be connected, connecting via the third interface is basically disabled, so that inputting of a connection request to the first interface via the third interface when the connecting via the third interface is permitted causes transitioning to a state in which the third connection and the first connection are connected. Therefore, there are advantageous effects that various settings can be made at the time of launching or maintenance of the process control system and that a high level of security is maintained at the time of operating the process control system.

DETAILED DESCRIPTION OF THE INVENTION

Details of an input-output apparatus according to some embodiments of the present invention are described below with reference to the drawings.

First Embodiment

Figure 1:
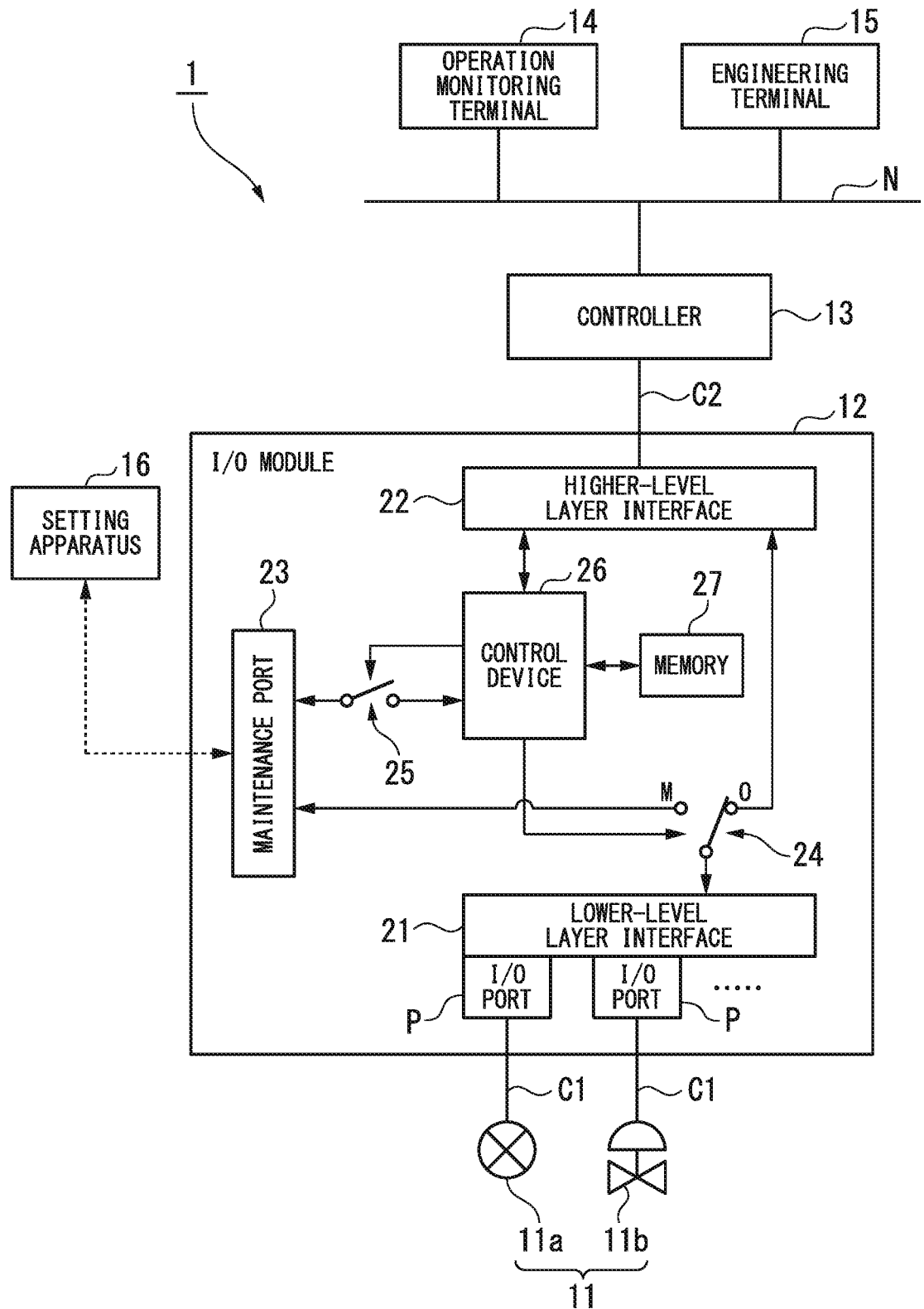
FIG. 1 is a block diagram showing an overall configuration of a process control system in which an input-output apparatus is used according to a first embodiment of the present invention.

FIG. 1 is a block diagram showing an overall configuration of a process control system in which an input-output apparatus according to an embodiment is used. As shown in FIG. 1, a process control system 1 may include a field device 11, an I/O module (input-output apparatus) 12, a controller 13, an operation monitoring terminal 14, and an engineering terminal 15. In response to instructions and the like from the operation monitoring terminal 14, the controller 13 controls the field device 11, thus performing control of industrial processes which are realized in a plant (not shown). A setting apparatus 16 shown, details of which are described below, is an apparatus used for performing a variety of settings, etc., on the field device 11 and the I/O module 12 at the time of launching and maintenance of the process control system 1.

Here, the field device 11 and the I/O module 12 are connected by a transmission line C1, and the I/O module 12 and the controller 13 are connected by a cable C2. Moreover, the controller 13, the operation monitoring terminal 14, and the engineering terminal 15 are connected to a control network N. The control network N may be a network that connects a plant site and a monitoring room, for example.

The field device 11 may include, for example, sensor devices such as a flow rate meter, a temperature sensor, etc., valve devices such as a flow rate control valve, an on-off valve, etc., actuator devices such as a fan, a motor, etc., and other devices installed at a plant site. In the present embodiment, for ease of understanding, an example is taken of a case in which a state amount in an industrial process to be controlled is a fluid flow rate. Accordingly, of a plurality of field devices 11 installed at the plant, one sensor device 11a for measuring the fluid flow rate and one valve device 11b for controlling (operating) the fluid flow rate are illustrated in FIG. 1.

The I/O module 12 is provided between the field device 11 and the controller 13, and a plurality of field devices 11 can be connected thereto. The I/O module 12 processes signals input and output between the connected field device 11 and the controller 13. For example, the I/O module 12 performs a process of converting a signal acquired from the field device 11 to a signal which can be received by the controller 13. The I/O module 12 connects the plurality of field devices 11 to the controller 13, and also relays signals input and output by the field device 11, as well as signals input and output by the controller 13. Details of the I/O module 12 are explained below.

The controller 13 communicates with the field device 11 in response to instructions and the like from the operation monitoring terminal 14 to control the field device 11. Specifically, the controller 13 acquires process values measured by a certain field device 11 (a sensor device 11a, for example), operates on an operation amount of another field device 11 (a valve device 11b, for example) to transmit the operated result, thus controlling the other field device 11 (the valve device 11b, for example).

The operation monitoring terminal 14 is a terminal which is operated by a plant operator, for example, to be used for monitoring processes. Specifically, the operation monitoring terminal 14 acquires input and output data of the field device 11 from the controller 13 to convey the behavior of the field device 11 and the controller 13, which configure the process control system 1, to the operator, and operates the controller 13 based on instructions from the operator.

The engineering terminal 15 generates information to be set to the field device 11, the I/O module 12, and the controller 13, based on process design information, which is design information of the process control system 1. The information generated by the engineering terminal 15 includes information relating to input and output between the field device 11 and the I/O module 12.

The setting apparatus 16 is connected to the I/O module 12 at the time of launching and maintenance of the process control system 1. The setting apparatus 16 uses information acquired from the engineering terminal 15 to make a variety of settings on the field device 11 and the I/O module 12. The setting apparatus 16 can be used to make settings on and adjustments to the field device 11 and the I/O module 12 even in states in which the controller 13 is not connected to the I/O module 12 or states in which the controller 13 is not operating though connected to the I/O module 12.

Next, the internal configuration of the I/O module 12 is explained in detail. As shown in FIG. 1, the I/O module 12 includes a lower-level layer interface 21 (first interface), a higher-level layer interface 22 (second interface), a maintenance port 23 (third interface), a switch 24 (switcher), a switch 25, a control device 26, and a memory 27.

The lower-level layer interface 21 includes a plurality of I/O ports P connected to the field device 11 (lower-level apparatus), and transmits and receives a variety of signals to and from the field device 11 connected to the I/O ports P. Here, the I/O ports P can make an analog signal input from the field device 11, an analog signal output to the field device 11, a digital signal input (discrete input) from the field device 11, and a digital signal output (discrete output) to the field device 11. Which of the above-described inputs and outputs is performed by the I/O ports P is set by instructions from the setting apparatus 16.

The higher-level layer interface 22 is connected to the controller 13 (higher-level apparatus) through a cable C2, and transmits and receives various signals to and from the controller 13. The maintenance port 23 transmits and receives various signals to and from the setting apparatus 16 via a connection cable (not shown) or by a wireless connection. Wired interfaces such as USB (Universal Serial Bus), Ethernet (registered trademark), etc., as well as wireless interfaces that perform wireless communications in compliance with wireless communications standards such as Wi-Fi (registered trademark), Bluetooth (registered trademark), etc., for example, may be used as the maintenance port 23.

Under a control of the control device 26, the switch 24 switches between connecting the higher-level layer interface 22 to the lower-level layer interface 21 and connecting the maintenance port 23 to the lower-level layer interface 21. Specifically, the switch 24 includes a terminal (terminal "O", meaning "online") connected to the higher-level layer interface 22 and a terminal (terminal "M", meaning "maintenance") connected to the maintenance port 23. When the switch 24 is connected to the terminal "O", the higher-level layer interface 22 is connected to the lower-level layer interface 21. When the switch 24 is connected to the terminal "M", the maintenance port 23 is connected to the lower-level layer interface 21.

Under a control of the control device 26, the switch 25 sets a space between the maintenance port 23 and the controller 26 to be an on state (closed state) or an off state (open state). The switch 25 is provided for restricting access to the maintenance port 23 (more precisely, access to the I/O module 12 through the maintenance port 23). Here, it is desirable that the switches 24 and 25 be hardware switches from a viewpoint of maintaining security.

The controller 26 controls the switches 24 and 25 based on a signal input through the higher-level layer interface 22 or a signal input through the maintenance port 23. The memory 27 is a non-volatile memory such as a flash ROM (Read Only Memory) or an EEPROM (Electrically Erasable and Programmable ROM), for example, and stores information that shows the operation mode and the transition state of the I/O module 12. Information stored in the memory 27 may be referenced by the engineering terminal 15 or the setting apparatus 16, for example, to check the operation mode and the transition state of the I/O module 12.

Here, the operation mode of the I/O module 12 includes "an engineering mode" and "an operating mode". The "engineering mode" is an operation mode which is envisioned for use at the time of engineering (launching) when process control is not being performed with the controller 13, etc., being not yet connected or running. The "operating mode" is an operation mode which is envisioned for a case in which maintenance of the device that makes up the process control system 1 is carried out while operating (while process control is being performed). The operation mode of the I/O module 12 is set to the "engineering mode" at the time of factory shipment. After incorporating the I/O module 12 into the process control system 1, the operation mode of the I/O module 12 is switched based on instructions from the engineering terminal 15 (or the operation monitoring terminal 14).

The I/O module 12 can transition to the following two states (see FIG. 3) when the operation mode thereof is set to the "engineering mode":
an online state ST11 (first state); and
a maintenance state ST12 (second state).

Moreover, the I/O module 12 can transition to the following three states (see FIG. 4) when the operation mode thereof is set to the "operating mode":
an online/M-port disable state ST13 (third state);
an online/M-port enable state ST14 (first state); and
the maintenance state ST12 (second state).

The online state ST11 is a state in which the lower-level layer interface 21 and the higher-level layer interface 22 can be connected to conduct communications between the field device 11 and the controller 13. The maintenance state ST12 is a state in which the lower-level layer interface 21 and the maintenance port 23 can be connected to conduct communications between the setting apparatus 16 and the field device 11.

The online/M-port disable state ST13 is a state in which the lower-level layer interface 21 and the higher-level layer interface 22 can be connected to conduct communications between the field device 11 and the controller 13, and access to the maintenance port 23 is disabled. The online/M-port enable state ST14 is a state in which the lower-level layer interface 21 and the higher-level layer interface 22 can be connected to conduct communications between the field device 11 and the controller 13, and access to the maintenance port 23 is enabled.

Figures 2, 3:
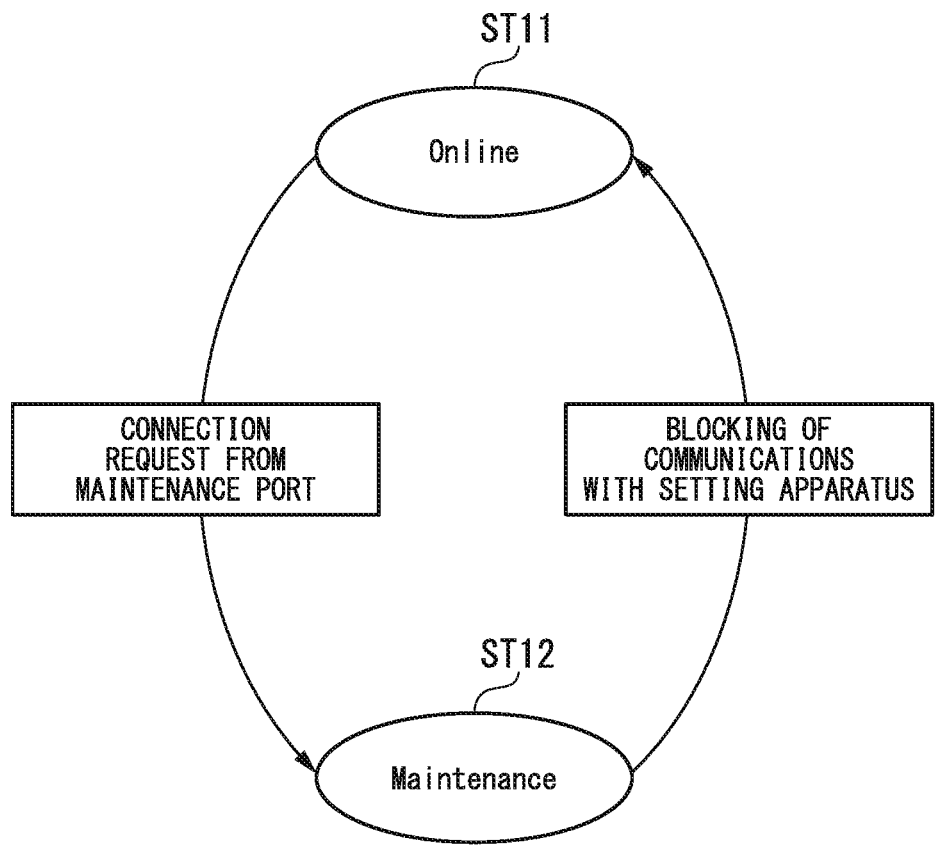
FIG. 2 is a diagram showing switch states in each of transition states of an I/O module according to the first embodiment of the present invention.
FIG. 3 is a state transition diagram for a case where an operation mode of the I/O module is set to "an engineering mode" according to the first embodiment of the present invention.

The above-described state transitioning is performed by the control device 26 controlling the switches 24 and 25. FIG. 2 is a diagram showing switch states in each of the transition states of the I/O module according to the first embodiment of the present invention. Moreover, FIG. 3 is a state transition diagram for a case where the operation mode of the I/O module is set to the "engineering mode" according to the first embodiment of the present invention. Furthermore, FIG. 4 is a state transition diagram for a case where the operation mode of the I/O module is set to the "operating mode" according to the first embodiment of the present invention.

As illustrated in FIG. 2, when the operation mode is set to the "engineering mode", control of the control device 26 causes the switch 25 to be in an always on state (a state where access to the maintenance port 23 is permitted). Then, a control of the control device 26 causes the switch 24 to be connected to the terminal "O" to transition to the online state (the online state ST11 in FIG. 3) and causes the switch 24 to be connected to the terminal "M" to transition to the maintenance state (the maintenance state ST12 in FIG. 3).

Here, as shown in FIG. 3, transitioning from the online state ST11 to the maintenance state ST12 is made when a connection request from the maintenance port 23 (a connection request from the setting apparatus 16 to the lower-level layer interface 21) is input. Moreover, transitioning from the maintenance state ST12 to the online state ST11 is made when communications with the setting apparatus 16 through the maintenance port 23 are blocked, or when there is a transition instruction (instruction to transition to the online state ST11) from the setting apparatus 16. Examples in which communications with the setting apparatus 16 are blocked include when the setting apparatus 16 stops functioning, when the setting apparatus 16 is removed from the maintenance port 23, etc.

Figure 4:
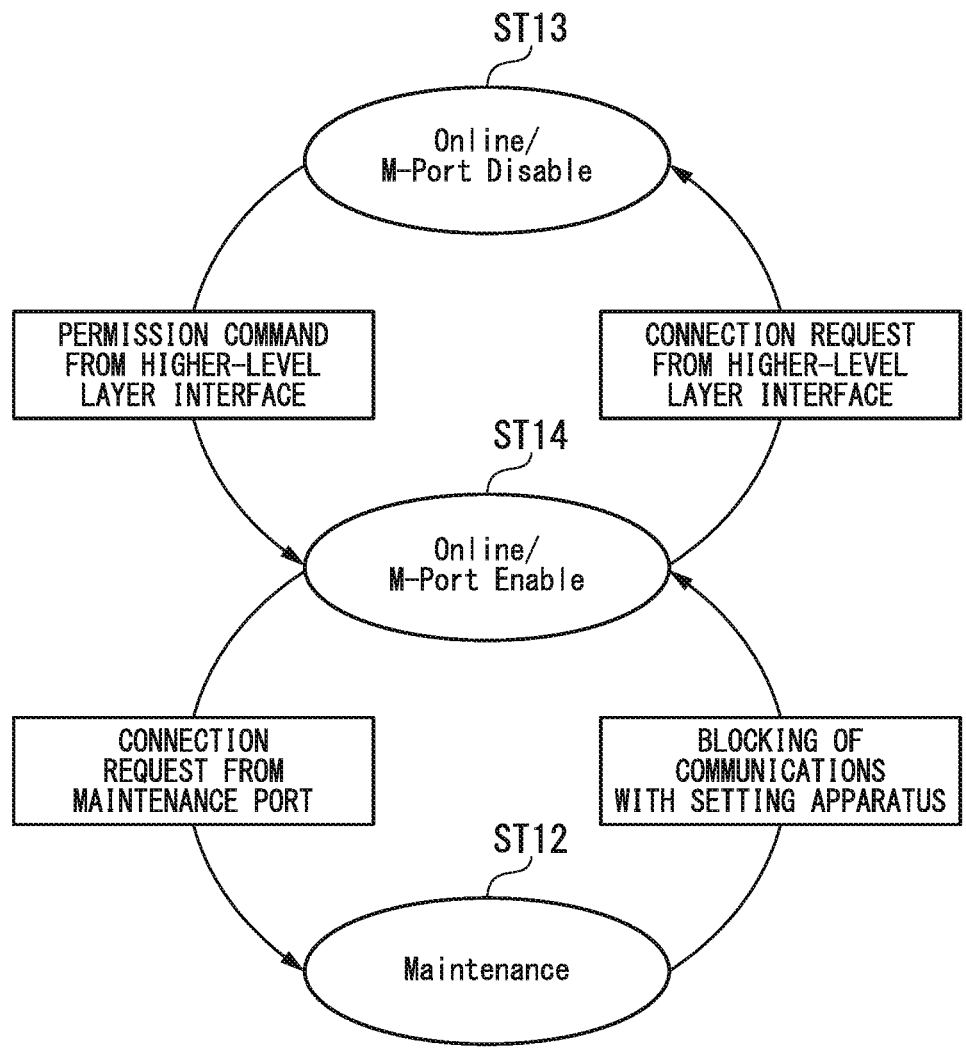
FIG. 4 is a state transition diagram for a case where the operation mode of the I/O module is set to "an operating mode" according to the first embodiment of the present invention.

As shown in FIG. 2, when the operation mode is set to the "operating mode", a control of the control device 26 causes the switch 25 to be in an off state (a state in which access to the maintenance port 23 is disabled), and causes the switch 24 to be connected to the terminal "O", causing transitioning to the online/M-port disable state (the online/M-port disable state ST13 in FIG. 4). Moreover, control of the control device 26 causes the switch 25 to be in an on state, causes the switch 24 to be connected to the terminal "O", causing transitioning to the online/M-port permission state (the online/M-port permission state ST14 in FIG. 4), and causes the switch 24 to be connected to the terminal "M", causing transitioning to the maintenance state (the maintenance state ST12 in FIG. 4).

Here, as shown in FIG. 4, transitioning from the online/M-port disable state ST13 to the online/M-port enable state ST14 is made when a permission command (a command from the higher-level layer interface 22 (or a command from the engineering terminal 15 (or the operation monitoring terminal 14) that indicates that access to the maintenance port 23 be permitted via the controller 13) is input. Transitioning from the online/M-port permission state ST14 to the maintenance state ST12 is performed when a connection request from the maintenance port 23 (a connection request from the setting apparatus 16 to the lower-level layer interface 21) is input.

Moreover, transitioning from the maintenance state ST12 to the online/M-port permission state ST14 is made when communications with the setting apparatus 16 through the maintenance port 23 is blocked, or when a transition instruction from the setting apparatus 16 (an instruction to cause transitioning to the online/M-port permission state ST14) is made. Transitioning from the online/M-port permission state ST14 to the online/M-port disable state ST13 is performed when a connection request from the higher-level layer interface 22 (for example, a connection request from the engineering terminal 15 to the lower-level layer interface 21) is input.

Next, operations of the I/O module 12 configured as described above is explained. Below, an operation at the time of launching the process control system 1 (launching operation) is explained, after which an operation at the time of performing maintenance on devices that make up the process control system 1 (maintenance operation) is explained.

(Launching Operation)

At the time of launching the process control system 1, the field device 11 and the I/O module 12 that are factory shipped are installed at a site (plant site), wired in, and connected by the transmission line C1. During the initial launching stage of the process control system 1, the I/O module 12 and the controller 13 are not connected. Once the above-described wiring is completed, the setting apparatus 16 is connected to the maintenance port 23 of the I/O module 12 to perform various settings on the field device 11 and the I/O module 12.

Here, as described above, the I/O module 12 has the operation mode at the time of factory shipment set to the "engineering mode", and the switch 25 thereof set to an on state (see FIG. 2). Therefore, when a connection request from the setting apparatus 16, which is connected to the maintenance port 23, to the lower-level layer interface 21 is output, the connection request is input to the control device 26 through the maintenance port 23 and the switch 25 in order. Then, a control of the control device 26 causes the switch 24 to be connected to the terminal "M". In this way, the I/O module 12 transitions from the online state ST11 to the maintenance state 12 as shown in FIG. 3.

Transitioning of the I/O module 12 to the maintenance state ST12 makes possible communications between the setting apparatus 16 and the field device 11. Therefore, an operator operates the setting apparatus 16 to perform various settings, adjustments, etc., on the field device 11 and the I/O module 12. When such settings are completed and the operator stops functioning of the setting apparatus 16, or when the operator removes the setting apparatus 16 from the maintenance port 23, the I/O module 12 transitions from the maintenance state ST12 to the online state ST11 as shown in FIG. 3. The I/O module 12 also transitions from the maintenance state ST12 to the online state ST11 when there is a transition instruction from the setting apparatus 16.

In this way, the I/O module 12 has the operation mode at the time of factory shipment set to the "engineering mode", so that access to the maintenance port 23 is permitted (the switch 25 is in an on state). Accordingly, the setting apparatus 16 may be connected to the maintenance port 23 of the I/O module 12 and a connection request to the lower-level layer interface 21 is made to cause the I/O module 12 to transition from the online state ST11 to the maintenance state ST12. Therefore, various settings on the field device 11 and the I/O module 12 that need to be made at the time of launching the process control system 1 may be carried out efficiently.

(Maintenance Operation)

The operation mode of the I/O module 12 is set to the "operating mode" while process control is being performed by the process control system 1. The state of the I/O module 12 is basically the online/M-port disable state ST13 (see FIG. 4). In other words, the lower-level layer interface 21 and the higher-level layer interface 22 can be connected to make communications between the field device 11 and the controller 13 possible and to disable access to the maintenance port 23 (the switch 25 is in an off state).

When performing maintenance on the device that makes up the process control system 1, first a permission command (a command indicating that access to the maintenance port 23 of the I/O module 12 be permitted) from the engineering terminal 15 (or from the operation monitoring terminal 14) to the I/O module 12 is transmitted. This permission command is input to the control device 26 through the controller 13 and the higher-level layer interface 22 of the I/O module 12. Then, a control of the control device 26 causes the switch 25 to be in an on state. The I/O module 12 thus transitions from the online/M-port disable state ST13 to the online/M-port enable state ST14 as shown in FIG. 4.

Here, when the setting apparatus 16 is connected to the maintenance port 23 of the I/O module 12, and a connection request to the lower order interface 21 is output from the setting apparatus 16, a control of the control device 26 causes the switch 24 to be connected to the terminal "M". In this way, the I/O module 12 transitions from the online/M-port enable state ST14 to the maintenance state ST12 as illustrated in FIG. 4.

The I/O module 12 transitioning to the maintenance state ST12 makes communications possible between the setting apparatus 16 and the field device 11. Therefore, the operator operates the setting apparatus 16 to make various settings, adjustments, etc., to the field apparatus 11, the I/O module 12, etc. Once such settings, etc., are completed, and the operator stops the setting apparatus 16 from functioning, or removes the setting apparatus 16 from the maintenance port 23, the I/O module 12 transitions from the maintenance state 12 to the online/M-port enable state ST14 as illustrated in FIG. 4. A transition instruction from the setting apparatus 16 may also cause a transition from the maintenance state ST12 to the online/M-port enable state ST14.

When a connection request (for example, a connection request from the engineering terminal 15 to the lower-level layer interface 21) is input from the higher-level layer interface 22 while the I/O module 12 is in the online/M-port enable state ST14, the I/O module 12 transitions from the online/M-port enable state ST14 to the online/M-port disable state ST13 as illustrated in FIG. 4. If the I/O module 12 transitions from the online/M-port disable state ST13 to the online/M-port enable state ST14, even when a connection request from the higher-level layer interface 22 is input before a connection request (a connection request to the lower-level layer interface 21) from the setting apparatus 16 is input, the I/O module 12 transitions from the online/M-port enable state ST14 to the online/M-port disable state ST13.

In this way, while process control is being carried out by the process control system 1, the I/O module 12 has the operation mode set to the "operating mode" and is basically in the online/M-port disable state ST13, during which access to the maintenance port 23 is disabled. Therefore, even if a malicious third party connects an apparatus corresponding to the setting apparatus 16 to the maintenance port 23 of the I/O module 12, the setting content of the field device 11 and the like cannot be changed. Further, malware cannot be introduced into the process control system 1. A high level of security can thus be ensured.

On the other hand, when performing maintenance on the device which makes up the process control system 1, a permission command from the engineering terminal 15 (or the operation monitoring terminal 14) causes the I/O module 12 to transition to the online/M-port enable state ST14 in which access to the maintenance port 23 is enabled. Therefore, the setting apparatus 16 may be connected to the maintenance port 23 of the I/O module 12 and a connection request may be made to the lower-level layer interface 21 to cause the I/O module 12 to transition from the online/M-port enable state ST14 to the maintenance state ST12. Thus, a variety of settings on the field device 11 and the I/O module 12 that are needed at the time of maintenance of the process control system 1 may be made efficiently.

Moreover, when a connection request from the higher-level layer interface 22 (for example, a connection request to the lower-level layer interface 21 from the engineering terminal 15) is input while the I/O module 12 is in the online/M-port enable state ST14, the I/O module 12 transitions to the online/M-port disable state ST13. Thus, access to the maintenance port 23 by a connection request from the higher-level layer interface 22 may be intentionally disabled, increasing the level of security.

For example, the engineering terminal 15 refers to the content of the memory 27 of the I/O module 12 through the controller 13 to measure the time in which the online/M-port enable state ST14 is continued and, when the measured time is greater than or equal to a predefined amount of time (one hour, for example), the above-described connection request may be transmitted to cause the I/O module 12 to be transitioned to the online/M-port disable state ST13. In this way, an unnecessarily prolonged state in which access to the maintenance port 23 is permitted may be prevented and the level of security may be increased.

Second Embodiment

Figures 5, 6:
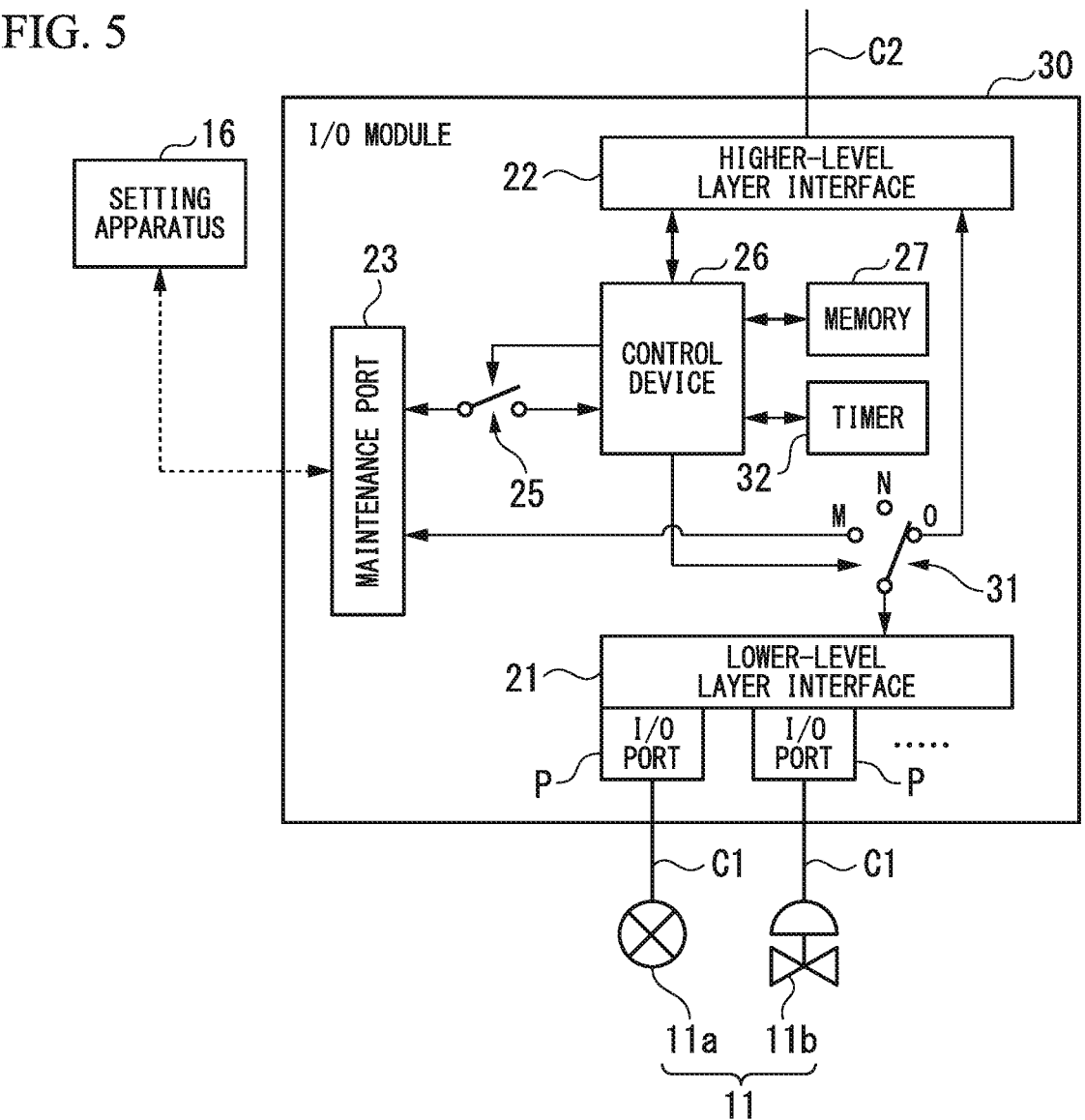
FIG. 5 is a block diagram showing a configuration of main parts of the input-output apparatus according to a second embodiment of the present invention.
FIG. 6 is a diagram showing switch states in each of the transition states of the I/O module according to the second embodiment of the present invention.

FIG. 5 is a block diagram showing a configuration of main portions of the input-output apparatus according to a second embodiment of the present invention. In FIG. 5, the same letters are given for the same blocks as those shown in FIG. 1. Moreover, while illustrations of the controller 13, the operation monitoring terminal 14, and the engineering terminal 15 in FIG. 1 are omitted in FIG. 5, an I/O module 30 as an input-output apparatus according to the present embodiment is provided between the field device 11 and the controller 13 here, similar to the I/O module 12 illustrated in FIG. 1.

The I/O module 30 illustrated in FIG. 5 differs from the I/O module 12 illustrated in FIG. 1 in that a switch 31 (switcher) is provided as a substitute for the switch 24, and a timer 32 has been added. In addition to the terminal "O" for connecting to the higher-level layer interface 22 and the terminal "M" for connecting to the maintenance port 23, the switch 31 also includes a neutral terminal (a neutral terminal "N", meaning neutral). Connecting the switch 24 to the neutral terminal "N" results in a neutral state in which neither the higher-level layer interface 22 nor the maintenance port 23 are connected to the lower-level layer interface 21. The timer 32 measures a predefined time (one hour, for example) under a control of the control device 26.

Here, similar to the I/O module 12 illustrated in FIG. 1, the I/O module 30 includes an "engineering mode" and an "operating mode" as operation modes. The "operating mode" of the I/O module 30 differs from the "operating mode" of the I/O module 12 shown in FIG. 1 in that it is capable of transitioning to the four states shown below (see FIG. 7):

an online state ST21 (third state),
an M-port enable state ST22 (first state),
a maintenance state ST23 (second state), and
an online wait state ST24 (fourth state).

Similar to the online state ST11 illustrated in FIG. 3, in the online state ST21, which is a state during which the lower-level layer interface 21 and the higher-level layer interface 22 are connected to make possible communications between the field device 11 and the controller 13, access to the maintenance port 23 is disabled. Similar to the online/M-port enable state ST14 illustrated in FIG. 4, the M-port enable state ST22 is a state during which the lower-level layer interface 21 and the higher-level layer interface 22 are connected to make possible communications between the field device 11 and the controller 13, and access to the maintenance port 23 is permitted. The M-port enable state ST22 is a transient state for transitioning to the maintenance state ST23.

Similar to the maintenance state ST12 illustrated in FIGS. 3 and 4, the maintenance state ST23 is a state during which the lower-level layer interface 21 and the maintenance port 23 are connected to make possible communications between the setting apparatus 16 and the field device 11. The online wait state ST24 is a neutral state where neither the higher-level interface 22 nor the maintenance port 23 is connected to the lower-level interface 21, but access to the maintenance port 23 is permitted. The online wait state ST24 is a transient state for transitioning to the online state ST21 or to the maintenance state ST21 after a maintenance task (maintenance) is completed.

Figure 7:
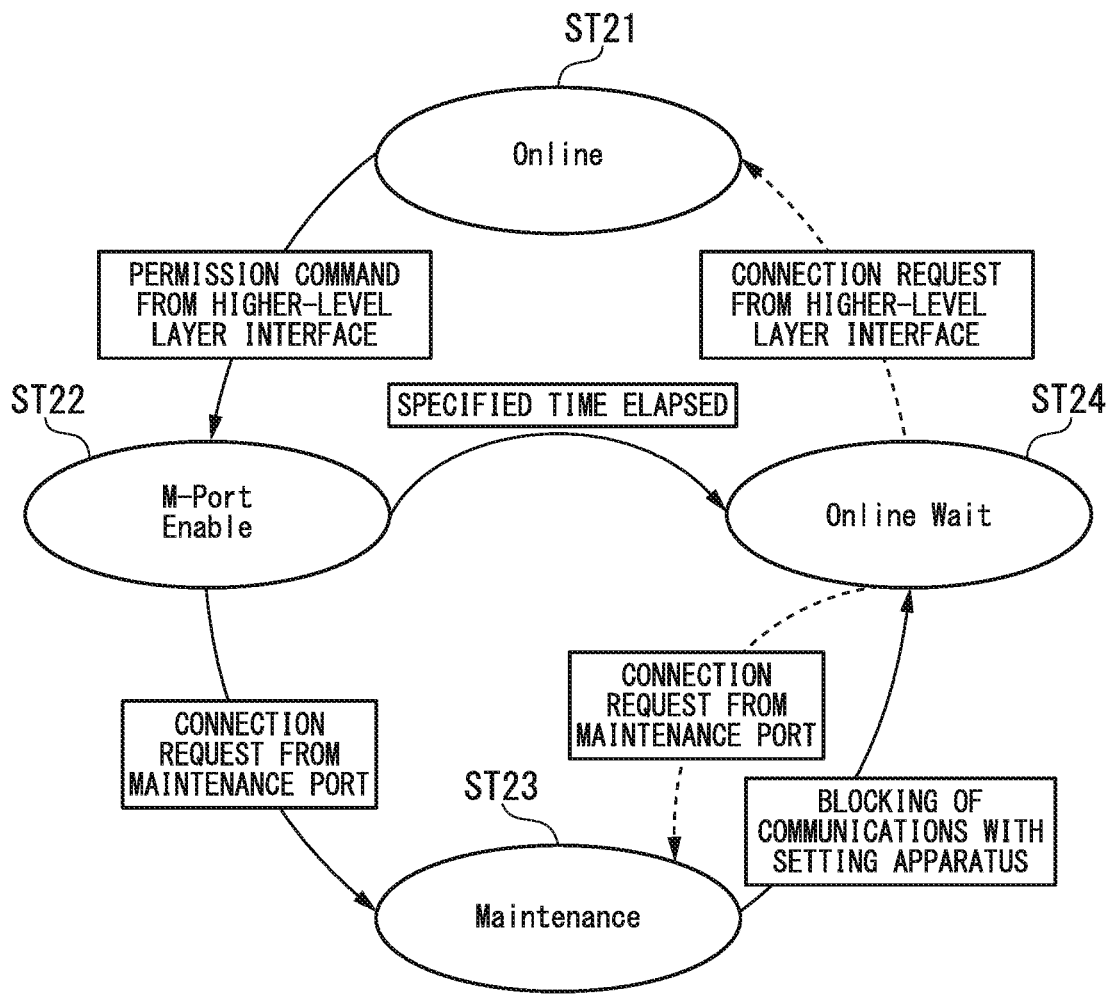
FIG. 7 is a state transition diagram for a case where the operation mode of the I/O module is set to "an operating mode" according to the second embodiment of the present invention.

The above-described state transitioning is performed by the control device 26 controlling the switch 25 and the switch 31. FIG. 6 is a diagram showing switch states in each of transition states of the I/O module in the second embodiment of the present invention. Moreover, FIG. 7 is a state transition diagram for a case where the operation mode of the I/O module is set to the "operating mode" in the second embodiment of the present invention. Switch states and state transitions for a case in which the operation mode of the I/O module is set to the "engineering mode" are similar to those described for the first embodiment, so that repeated explanations are omitted.

As illustrated in FIG. 6, when the operation mode is set to the "operating mode", a control of the control device 26 causes the switch 25 to be in an off state (a state where access to the maintenance port 23 is disabled) and causes the switch 31 to be connected to the terminal "O" to cause transitioning to the online state (the online state ST21 illustrated in FIG. 7). Moreover, a control of the control device 26 causes the switch 25 to be in an on state and causes the switch 31 to be connected to the terminal "O" to cause transitioning to the M-port enable state (the M-port enable state ST22 illustrated in FIG. 7), causes the switch 31 to be connected to the terminal "M" to cause transitioning to the maintenance state (the maintenance state ST23 illustrated in FIG. 7), and causes the switch 31 to be connected to the terminal "N" to cause transitioning to the online wait state (the online wait state ST24 illustrated in FIG. 7).

Here, as shown in FIG. 7, transitioning from the online state ST21 to the M-port enable state ST22 is performed when a permission command (a command from the engineering terminal 15 (or the operation monitoring terminal 14) indicating that access to the maintenance port 23 be permitted) is input from the higher-level layer interface 22. Transitioning from the M-port enable state ST22 to the maintenance state 23 is performed when a connection request from the maintenance port 23 (connection request from the setting apparatus 16 to the lower-level layer interface 21) is input.

Moreover, transitioning from the maintenance state STS23 to the online wait state ST24 is performed when communications with the setting apparatus 16 through the maintenance port 23 are blocked, or when there is a transition instruction (an instruction to cause transitioning to the online wait state ST24) from the setting apparatus 16. Moreover, transitioning from the M-port enable state ST22 to the online wait state ST24 is performed when a predefined time has elapsed during the M-port enable state ST22 from when transitioning to the M-port enable state ST22 (when the predefined time is measured by the timer 32). Moreover, for a case of being in the online wait state ST24, transitioning to the maintenance state ST23 is made when a connection request is input from the maintenance port 23 and transitioning to the online state ST21 is made when a connection request from the higher-level layer interface 22 is input.

Next, operations of the I/O module 30 configured as described above are explained. An operation for launching the process control system (launching operation) is similar to that for the first embodiment, so that an operation for a case in which maintenance of devices which make up the process control system 1 (maintenance operation) is conducted is explained below.

(Maintenance Operation)

The operation mode of the I/O module 30 is set to the "operating mode" during the time process control is performed by the process control system, and a state in which the I/O module 30 is in is basically the online state ST21 (see FIG. 7). In other words, the state in which the I/O module 30 is in is a state in which the lower-level layer interface 21 and the higher-level layer interface 22 are connected to make possible communications between the field device 11 and the controller 13 and access to the maintenance port 23 is disabled (the switch 25 is in an off state).

When performing maintenance of the devices that make up the process control system, similar to the first embodiment, a permission command (a command indicating that access to the maintenance port 23 of the I/O module 30 be permitted) is transmitted from the engineering terminal 15 (or the operation monitoring terminal 14) to the I/O module 30 through the controller 13. When the permission command is input to the control device 26 of the I/O module 30, a control of the control device 26 causes the switch 25 to be in an on state, causing the I/O module 30 to transition from the online state ST21 to the M-port enable state ST22 as illustrated in FIG. 7. Upon transitioning to the M-port enable state ST22, measurement of time by the timer 32 begins.

When the setting apparatus 16 is connected to the maintenance port 23 of the I/O module 30 and, if a connection request from the setting apparatus 16 to the lower-level layer interface 21 is output before a predefined time elapses for time measurement of the timer 32, control of the control device 26 causes the switch 31 to be connected to the terminal "M". As shown in FIG. 7, this causes the I/O module 30 to transition from the M-port enable state ST22 to the maintenance state ST23.

The I/O module 30 can transition to the maintenance state ST23 to make possible communications between the setting apparatus 16 and the field device 11. Therefore, an operator operates the setting apparatus 16 to perform various settings, adjustments, etc., to the field device 11 and to the I/O module 30. The control device 26 detects when such settings are completed and an operator stops functioning of the setting apparatus 16 or removes the setting apparatus 16 from the maintenance port 23 and, as illustrated in FIG. 7, the I/O module 30 transitions from the maintenance state ST23 to the online wait state ST24. Even if there is a transition instruction from the setting apparatus 16, the I/O module 30 transitions from the maintenance state ST23 to the online wait state ST24.

If time measurement by the timer 32 is completed after the I/O module 30 transitions to the M-port enable state ST22, the control device 26 of the I/O module 30 causes transitioning from the M-port enable state ST22 to the online wait state ST24 as illustrated in FIG. 7.

When the I/O module 30 is in the online wait state ST24, if a connection request from the maintenance port 23 (a connection request to the lower-level layer interface 21 from the setting apparatus 16) is input, the I/O module 30 transitions from the online wait state ST24 to the maintenance state ST23 as illustrated in FIG. 7. On the other hand, when the I/O module 30 is in the online wait state ST24, when a connection request from the higher-level layer interface 22 (for example, a connection request to the lower-level layer interface 21 from the engineering terminal 15) is input, the I/O module 30 transitions from the online wait state ST24 to the online state ST21 as illustrated in FIG. 7.

In this way, while the process control by the process control system is performed, the I/O module 30 has the operation mode set to the "operating mode" and is basically in a state where access to the maintenance port 23 is disabled (the online state ST21), similar to the I/O module 12 of the first embodiment. Therefore, even if a malicious third party connects an apparatus which corresponds to the setting apparatus 16 to the maintenance port 23 of the I/O module 30, the setting content of the field device 11 cannot be changed. Further, malware cannot be introduced into the process system 1. A high level of security can thus be ensured.

On the other hand, when performing maintenance on the devices that makes up the process control system 1, the I/O module 30 transitions to a state where access to the maintenance port 23 is permitted (the M-port enable state ST22) by a permission command from the engineering terminal 15 (or the operation monitoring terminal 14), similar to the first embodiment. Therefore, the setting apparatus 16 may be connected to the maintenance port 23 of the I/O module 30 and a connection request to the lower-level layer interface 21 may be made to cause the I/O module 30 to transition from the M-port permission state ST22 to the maintenance state ST23. Thus, various settings on the field device 11 and the I/O module 30 that are necessary at the time of maintaining the process control system may be efficiently performed.

Moreover, when predetermined time has elapsed from transitioning to the M-port enable state ST22, or when communications with the setting apparatus 16 through the maintenance port 23 is blocked (or when there is a transition instruction from the setting apparatus 16), the I/O module 30 transitions to the online wait state ST24. In this way, an unnecessarily prolonged state in which access to the maintenance port 23 is permitted while the lower-level layer interface 21 and the higher-level layer interface 22 are connected may be prevented. The security level can thus be increased.

Figure 8:
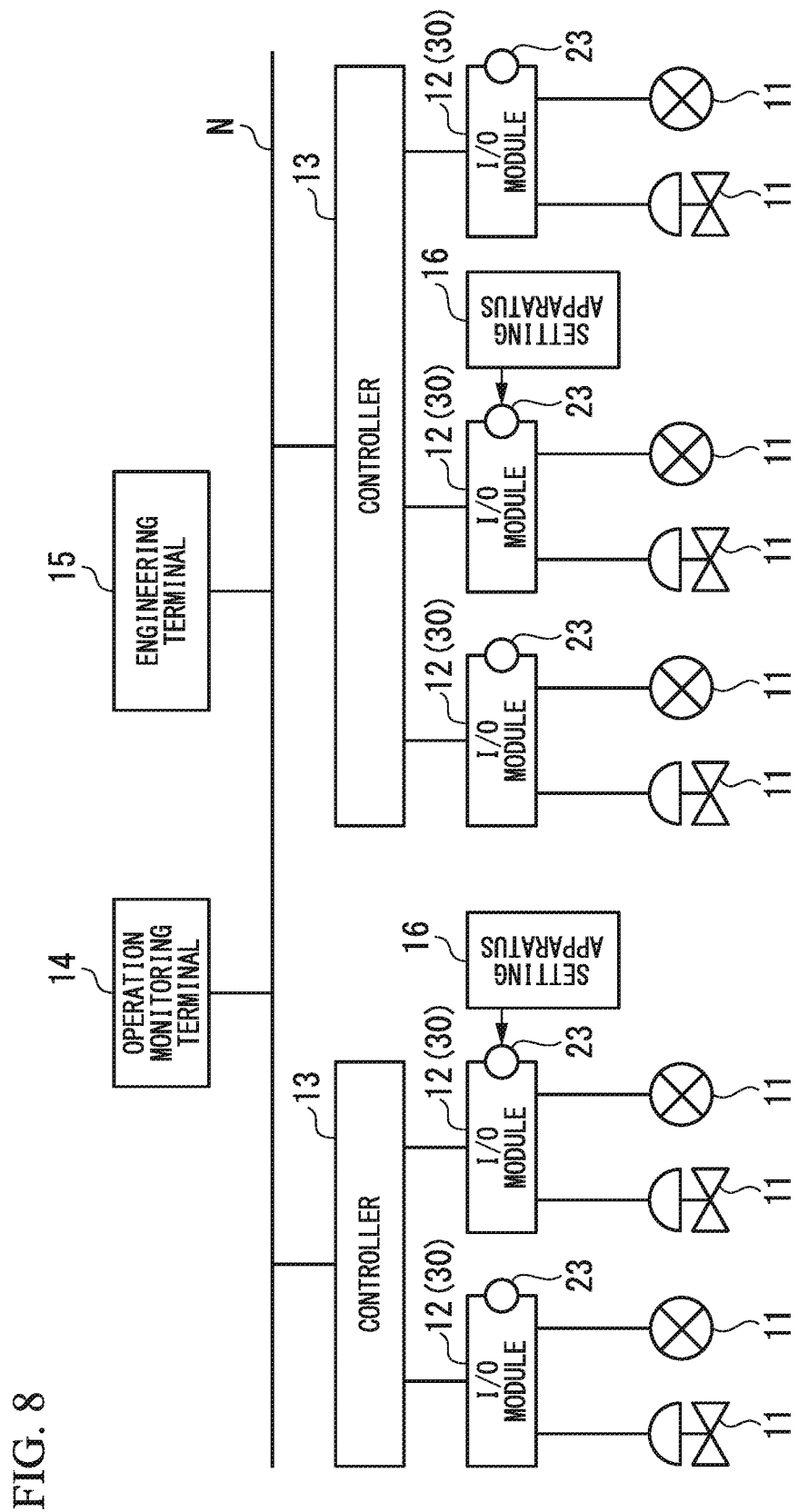
FIG. 8 is a block diagram showing an example configuration of the process control system including a plurality of controllers and I/O modules.

In order to simplify the explanations of the above-described first and second embodiments, examples of using one each of the controller 13 and the I/O module 12 (I/O module 30) that are provided in the process control system are explained. As shown in FIG. 8, a plurality of the controller 13 and the I/O module 12 (I/O module 30) are generally provided in the process control system 1. FIG. 8 is a block diagram showing an example configuration of a process control system having a plurality of controllers and I/O modules.

In such a process control system, permission commands (commands indicating that access to the maintenance port 23 be permitted) from the engineering terminal 15 (or the operation monitoring terminal 14), are transmitted only to the I/O module 12 (I/O module 30) which requires maintenance. Then, as shown in FIG. 8, the setting apparatus 16 is connected to the maintenance port 23 of the I/O module 12 (I/O module 30) that requires maintenance to make various settings, adjustments, etc., on the field device 11 and the I/O module 12. In this way, a plurality of the setting apparatuses 16 are used to simultaneously conduct maintenance on a plurality of the I/O modules 12 (I/O modules 30). When the I/O module 30 is provided in the process control system shown in FIG. 8, the I/O modules 30 transition to the online wait state if the setting apparatuses 16 are not connected to the I/O modules 30, to which access is permitted, within a predefined time period. Security is thus ensured.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims. For example, although examples of using the I/O module 12 (I/O module 30) as an input-output apparatus are explained in the above-described embodiments, embodiments of the present invention may also be applied to input-output apparatuses such as controllers, network repeaters, remote I/O apparatuses, wireless gateways, and the like.

What is claimed is:

1. An input-output apparatus which is used in a process control system, the input-output apparatus comprising:
   a lower level interface to which a field device in a plant is connected;
   a second higher level interface to which a controller that is configured to control the field device in the plant is connected;
   a third maintenance interface to which an external setting apparatus is connected;
   a first switch which switches between a first connection of the second higher level interface to the first lower level interface and a second connection of the third maintenance interface to the first lower level interface;
   a control device which controls the first switch; and
   a second switch which is controlled by the control device and is disposed between the third maintenance interface and the control device,
   wherein the control device causes the input-output apparatus to enter to one of a first state in which the second higher level interface is connected to the first lower level interface by the first switch and the third maintenance interface is connected to the control device by the second switch, a second state in which the third maintenance interface is connected to the first lower level interface by the first switch and the third maintenance interface is connected to the control device by the second switch, and a third state in which the second higher level interface is connected to the first lower level interface by the first switch but the third maintenance interface is disconnected from the control device by the second switch, and
   wherein the input-output apparatus further comprises:
      an engineering mode for engineering of the process control system allowing the input-output apparatus, when a setting apparatus sends a request for connection to the control device via the third maintenance interface, to transit from the first state to the second state for settings and/or adjustments on the field device and on the input-output apparatus and allowing the input-output apparatus to transit back to the first state when the settings and/or adjustments are completed; and an operating mode for performing process control of the process control system when the input-output apparatus is in the third state.

2. The input-output apparatus according to claim 1, wherein the control device sets the second switch to an open state to restrict access, and sets the second switch to a closed state to permit access.

\* \* \* \* \*